UNITED STATES PATENT OFFICE.

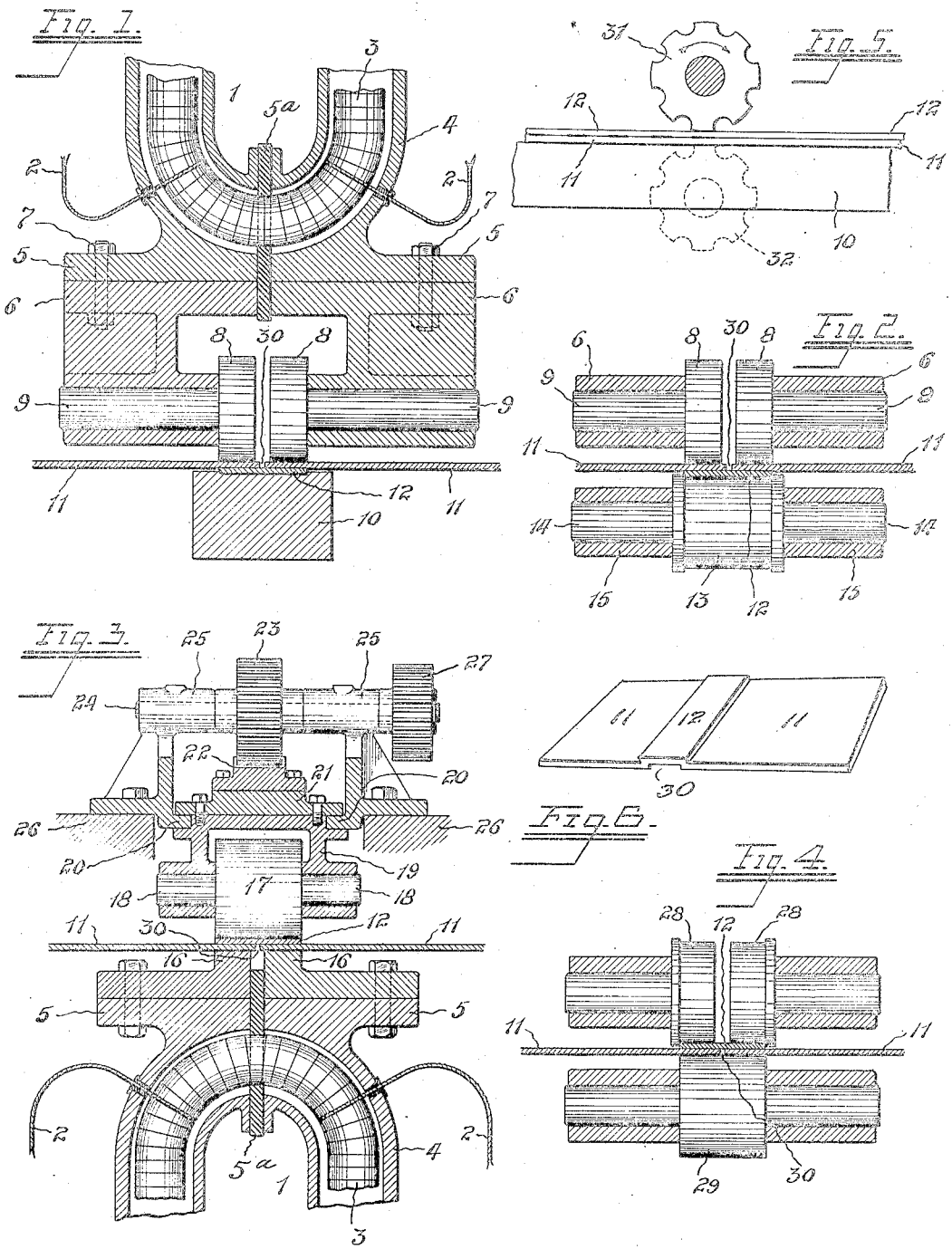

FRANK L. SESSIONS, OF LAKEWOOD, OHIO.

METHOD OF WELDING METAL PLATES AND THE LIKE.

1,278,234.  Specification of Letters Patent.  Patented Sept. 10, 1918.

Application filed March 26, 1917. Serial No. 157,405.

*To all whom it may concern:*

Be it known that I, FRANK L. SESSIONS, a citizen of the United States, residing at Lakewood, in the county of Cuyahoga and State of Ohio, have invented certain new and useful Improvements in Methods of Welding Metal Plates and the like, of which the following is a specification.

My invention relates to a novel method of joining metal plates or sheets by progressively welding the surfaces of such plates or sheets adjacent their abuttingly related edges to a strip or batten of metal which spans the meeting line of the plates, and forms, after welding, a connecting strip, integral with the plates; making a strong, tight bond between the plates superior to a riveted or spot welded joint; and having the advantage over the ordinary lap welded joint of leaving the surfaces of the plates in the same plane instead of being offset the thickness of the plates as they are when lap welded without scarfing the edges. My method is superior to the butt welding method in that the thickness of the metal is not increased at the joint as it is by the upsetting of the metal in the butt welding process, and it is further superior to the butt welding method in that there is no flash or burr thrown up which has to be subsequently removed by cutting and grinding.

It will be understood that while I have herein shown and described a method for making welded batten joints, one of the principles of my method, that of applying both terminals of an electric welding circuit to the same side of the work, is well adapted to the welding of short joints such as are made between the ends of narrow bars and which do not require the application of the progressive welding features of my method. This principle, however, finds its greatest value in batten welding the edges of large plates or tubes where it is always inconvenient and often impossible to apply one terminal upon one side of the work and the other terminal upon the other side of the work.

In carrying out my method, a source of electric energy for supplying electric current in sufficient volume, at suitable voltage, say five to ten volts, has its terminals connected to a pair of contact members adjacent to but out of contact with each other. A third member, which is both a mechanical pressure and electrical conductor member, is arranged adjacent to and spanning the space between the two contact members. The plates to be welded and the joint strip are fed between the contact members and the pressure member with sufficient pressure applied thereto to make good electrical contact between the contact members and the plates upon the one side and between small areas of the surface of the joint strip and the surfaces of the plates upon the other side.

An electric circuit is thus established through the contacting surfaces of the parts to be welded and the joint strip or batten, which circuit will have its lowest electrical resistance through the small areas of such surfaces which are under pressure immediately between the contact members and the pressure member. The current flowing through the circuit will, therefore, be concentrated, largely, into these small areas or zones of pressure and will heat them to a welding temperature, while the applied pressure will cause the parts to be securely welded together. It will be understood that the point of application of pressure is traversed along the joint strip at such a speed that the welding of the parts is progressively performed simultaneously with and in the zone of such application of pressure.

From the standpoint of electrical efficiency, it is immaterial whether the work is stationary and the contact and pressure members, either or both move, or whether the work moves and the contact and pressure members, either or both, are stationary. Mechanically, any of the described arrangements may be chosen that seems best suited to do the work upon the particular pieces involved.

In the drawings, Figure 1 is a cross section at right angles to the joint of a pair of plates and a joint strip being welded in an apparatus in which the plates, the joint strip and the pressure and conductor member are stationary, while the contact members are moved along the joint as the weld is made;

Fig. 2 is a cross section of a pair of plates and a joint strip similar to those found in Fig. 1, but being welded in an apparatus in which the work is passed between roller contacts and a roller conductor and pressure member;

Fig. 3 is a cross section of a pair of plates and a joint strip similar to those shown in Figs. 1 and 2, but being welded in an apparatus in which the work is held stationary upon a pair of stationary, elongated contact members while the pressure and conductor member moves along over the line of the joint;

Fig. 4 is a cross section of a pair of plates and a joint strip similar to those in Fig. 3, but being welded in an apparatus in which a pair of roller contacts and a roller pressure member supported in stationary bearings are used, while the work moves between them; and Fig. 5 is a side view of a modification of my method and apparatus whereby a succession of short welds alternating with unwelded spaces may be made.

Fig. 6 is a perspective view of a batten joint welded in accordance with my invention. It will be understood that, due to the flowing of the metal under pressure at the welding temperature, the thickness at the weld after welding will not be equal to the original combined thicknesses of the work at this point before welding.

In Fig. 1, there is shown an alternating current transformer, 1, having leading-in primary wires, 2, 2, connected to the primary coil, 3. 4 is a single turn secondary coil which also forms an inclosing housing for the primary coil. 5, 5 are secondary contact flanges formed integral with the secondary coil. 5ª is insulation between the ends of the secondary coil.

To the flanges, 5, 5, are bolted metal contact bearing supports, 6, 6, by bolts, 7, 7. A pair of roller contacts, 8, 8, having metal spindles, 9, 9, are carried by the bearing members, 6, 6. 10 is a stationary pressure or supporting bar of conducting material. 11, 11 are the plates to be joined, and 12 is the joint strip or batten. In an apparatus of this kind the joint strip, 12, and the plates, 11, are held stationary upon the pressure and supporting member, 10, while the contact members, 8, 8, the transformer, 1 and the bearing supports, 6, are moved along the joint, the joint strip being progressively welded to both of the plates simultaneously by electric current which passes between the contact members, 8, through the contact surfaces between the plates and the joint strip as the areas of concentration of the electric current are traversed along the joints being welded. In order to reduce the electrical resistance of the circuit and to prevent the overheating of the joint strip along the meeting line of the plates, the pressure member, 10, is made of conducting material so that the larger part of the current passes through it instead of through the joint strip across the meeting line of the plates.

In Fig. 2, the presure and supporting bar, 10, is replaced by a pressure roller, 13, having trunnions 14, 14, which rotate in stationary bearings, 15, 15. In this case the plates, 11, 11, and joint strip, 12, are moved, while the welding apparatus is stationary except for the rotating of the contacts, 8, 8, and pressure member, 13, which are revolved by frictional contact with the moving work.

In Fig. 3, the transformer, 1, is shown located below the work, while the contact members consist of conductor bars, 16, 16, which are bolted to the contact flanges, 5, of the secondary of the transformer. The plates, 11, 11, and joint strip, 12 are laid upon the contact members, 16, while a pressure roller, 17, is caused to traverse the joint strip. Pressure roller, 17, is provided with a shaft of trunnions 18, having bearings in a sliding carriage, 19. The carriage, 19, is slidably mounted upon guides, 20, 20, and held in place by a cap member, 21. A toothed rack, 22, is secured to the cap member, 21, the teeth of rack, 22, being engaged by a toothed pinion, 23, which is fixed upon a rotatable shaft, 24, having stationary bearings, 25, 25, supported by the frame, 26, of the machine. Rotation is imparted to gear, 23, by suitable power connections to gear, 27, which is also secured to shaft, 24. Any other suitable means may be employed for rotating gear, 23, and causing the rack 22, and contact roller, 17, to traverse the length of the joint strip.

Fig. 4 shows an arrangement of contact and pressure members similar to that shown in Fig. 2, but the plates, 11, and joint strip, 12, are transposed in Fig. 4 so that the joint strip is in contact with the contact rolls, 28, 28, while the plates 11, are in contact with the pressure roll, 29. In some cases, as, for instance, where there is a considerable distance between the abuttingly related edges of the plates being welded, this arrangement is permissible, but in general, I find it better to dispose the work so that the plates make contact with the contact members, and the joint strip makes contact with the pressure member in order to cause all of the current to pass through the contact surfaces between the plates and the joint strip. In the drawings, I have shown an open space 30, between the plates. In actual practice, this space may be made very large, for instance, several inches or anything greater that is desired, or, it may be reduced to practically nothing. In the latter case, the resistance of the edge contact of the plates with each other will be so great, compared to the low resistance of the pressure member, that very little current will flow through the edges of the plates. With low resistance metals, or, with plates, the edges of which, on account of being accurately formed, make a low resistance contact with each other, the edge may be painted with insulating compound or insulation may be placed in the space, 30, so as to force the electric welding current to take the desired path across the contacts between the surfaces of the plates and the joint strip.

It will be seen that the two welding joints are electrically in series due to the arrangement of the contact and pressure members and that the same current heats both joints simultaneously. Should it happen that the metal should be heated to the welding temperature at one of the joints quicker than at the other such a circumstance will not prevent the proper welding of the latter as would be the case if the two joints were electrically in parallel. All that is necessary to insure both welds being properly made, according to my method, is to make the speed of travel of the work relative to the welding points such that there is sufficient time for the slower welding joint to come to the welding temperature under the contacts before the work progresses further. This may be accomplished by either manual or automatic control of the speed at which the welding points traverse the work, or, by varying the current volume by any of the well known means and methods available, such, for instance, as rheostatic or compensator control, or by varying the ratio of primary to secondary coil turns in the welding transformer.

Instead of making a continuously welded joint, a succession of short welded surfaces with unwelded spaces between them may be produced, by my method, by employing toothed contact rollers as shown in Fig. 5. In this figure, the plates, 11, and joint strip, 12, may be disposed as in the other figures, but, instead of plain cylindrical roller contacts, I have shown toothed roller contacts, 31, so as to produce a succession of short welded surfaces alternating with unwelded spaces. In this case the contacts, 31, are preferably, positively rotated by means other than the friction with the passing work. It is obvious that the pressure member may also be a toothed roller with teeth registering opposite those of the contact rollers, as shown in dotted lines at 32.

My invention is not limited to the welding of plates and bars, but, as will be apparent to those skilled in the art, it may be followed in welding other metal products, such, for instance, as metal tubes, barrels or cylinders, metal packing boxes, metal screens, woven wire fences or fabrics and others.

It will be understood that in applying my method of electric welding, the volume of electric current required, and hence the voltage to be maintained between the contact members depends upon the kind of metal being welded, its electrical resistance, the thickness of the sheets, the condition of the surfaces at the welding point, the speed of traverse and other factors with which those skilled in the art are familiar. It will also be understood that any convenient source of electric energy supply furnishing either direct or alternating current may be utilized.

I claim:—

1. The method of joining metal plates which consists of placing the edges or ends of the parts to be joined in abutting relation to each other; applying a metal batten to the parts to be joined, the metal batten spanning the meeting line or space between said parts; and welding the batten simultaneously to each of the parts to be joined by passing an electric welding current through the contacting surfaces between said parts and said batten, the contacting surfaces between the batten and one of the parts to be joined being electrically in series with the contacting surfaces between the batten and the other of the parts to be joined.

2. The method of joining metal plates or sheet material which consists of placing the edges of the parts to be joined in abutting relation to each other; applying a metal batten to the parts to be joined, the metal batten spanning the meeting line or space between said parts; and progressively welding the batten simultaneously to each of the parts to be joined by establishing an electric circuit through the contacting surfaces of said plates and said batten; and progressively applying pressure thereto whereby the electrical resistance of small areas of said contacting surfaces subjected to such pressure is reduced and the flow of current is concentrated, largely, into said small areas, to cause them to be heated to a welding temperature and to be welded together.

3. The method of joining metal plates or sheet material which consists of placing the edges of the parts to be joined in abutting relation to each other; applying a metal batten to the parts to be joined, the metal batten spanning the meeting line or space between said parts; and progressively welding the batten simultaneously to each of the parts to be joined by establishing an electric circuit through the contacting surfaces of said plates and said batten; and progressively applying pressure thereto whereby the electrical resistance of small areas of said contacting surfaces subjected to such pressure is reduced and the flow of current is concentrated, largely, into said small areas, to cause them to be heated to a welding temperature and to be welded together, the contacting surfaces between the batten and one of the parts to be joined being electrically in series with the contacting surfaces between the batten and the other of the parts to be joined.

4. The method of joining metal plates or sheet material which consists of placing the edges of the parts to be joined in abutting relation to each other, applying a metal batten to the parts to be joined, the metal batten spanning the meeting line or space between said parts, and progressively welding a short portion of the batten simultaneously to each of the parts to be joined by establishing an electric circuit through the contacting surfaces of said plates and said batten and progressively applying pressure along said short portion whereby the electrical resistance of small areas of said contacting surfaces subjected to such pressure is reduced and the flow of current is concentrated, largely, into said small areas, to cause them to be heated to a welding temperature and to be welded together; then skipping a portion of the length of said batten and progressively applying pressure to another short portion of it whereby the electrical resistance of small areas of the contacting surfaces of said plates and said batten subjected to such pressure is reduced and the flow of current is concentrated, largely, into said small areas, to cause them to be heated to a welding temperature and to be welded together; and to continue such spaced-apart welding operations throughout the desired length of the batten; these operations resulting in the joining of said metal plates or sheet material and said metal batten by spaced-apart, welded portions alternating with unwelded portions.

5. The method of joining metal plates or sheet material which consists of placing the edges of the parts to be joined in abutting relation to each other, applying a metal batten to the parts to be joined, the metal batten spanning the meeting line or space between said parts, and progressively welding a short portion of the batten simultaneously to each of the parts to be joined by establishing an electric circuit through the contacting surfaces of said plates and said batten and progressively applying pressure along said short portion whereby the electrical resistance of small areas of said contacting surfaces subjected to such pressure is reduced and the flow of current is concentrated, largely, into said small areas, to cause them to be heated to a welding temperature and to be welded together; then skipping a portion of the length of said batten and progressively applying pressure to another short portion of it whereby the electrical resistance of small areas of the contacting surfaces of said plates and said batten subjected to such pressure is reduced and the flow of current is concentrated, largely, into said small areas, to cause them to be heated to a welding temperature and to be welded together; and to continue such spaced-apart welding operations throughout the desired length of the batten, these operations resulting in the joining of said metal plates or sheet material and said metal batten by spaced-apart, welded portions alternating with unwelded portions, the contacting surfaces between the batten and one of the parts to be joined being electrically in series, during the welding operation with the contacting surfaces between the batten and the other of the parts to be joined.

6. The method of joining metal plates or sheet material which consists of placing the edges of the parts to be joined in abutting relation to each other, one of said parts being in electrical contact with one terminal of an electric circuit and the other of said parts being in contact with the other terminal of said electric circuit; applying a metal batten to the parts to be joined, the metal batten spanning the meeting line or space between said parts and progressively welding the batten simultaneously to both of the parts to be joined by traversing a pressure member made of electrical conducting material progressively along the joint to be welded to cause the progressive local heating of said parts and said batten and the welding thereof together by the electric current flowing through them at the point where said pressure is applied.

7. The method of joining metal plates or sheet material which consists of placing the edges of the parts to be joined in abutting relation to each other, one of said parts being in electrical contact with one terminal of an electric circuit and the other of said parts being in contact with the other terminal of said electric circuit; applying a metal batten to the parts to be joined, the metal batten spanning the meeting line or space between said parts and progressively welding the batten simultaneously to both of the parts to be joined by traversing a pressure member made of electrical conducting material progressively along the joint to be welded to cause the progressive local heating of said parts and said batten and the welding thereof together by the electric current flowing through them at the point where said pressure is applied, the contacting surfaces between the batten and one of the parts to be joined being electrically in series with the contacting surfaces between the batten and the other of the parts to be joined.

In testimony whereof I affix my signature in the presence of two witnesses.

FRANK L. SESSIONS.

Witnesses:
 LOUIS A. CORLETT,
 FRANCES MANN.